United States Patent [19]

Ikenaga et al.

[11] Patent Number: 4,886,851

[45] Date of Patent: Dec. 12, 1989

[54] POLYACETAL RESIN COMPOSITION

[75] Inventors: Yukio Ikenaga; Masami Yamawaki, both of Fuji, Japan

[73] Assignee: Polyplastics Company, Ltd., Osaka, Japan

[21] Appl. No.: 830,022

[22] Filed: Feb. 14, 1986

[30] Foreign Application Priority Data

Feb. 4, 1985 [JP] Japan ................................. 60-19766

[51] Int. Cl.$^4$ ...................... C08L 59/00; C08L 51/04; C08K 3/26
[52] U.S. Cl. .................................... 524/425; 524/451; 524/504; 525/64
[58] Field of Search .................. 525/64; 524/425, 451, 524/504

[56] References Cited

U.S. PATENT DOCUMENTS 3,027,352 3/1962 Walling et al. .
4,096,202 6/1978 Farnham ............................. 523/201
4,296,216 10/1981 Sakano et al. ........................ 525/64

FOREIGN PATENT DOCUMENTS 0115373 8/1984 European Pat. Off. .
1964156 6/1971 Fed. Rep. of Germany .
2439803 5/1980 France .

OTHER PUBLICATIONS

Sittig, "Polyacetals: What You Should Know", Nov. 1962, vol. 41, #11, Hydrocarbon Processing & Pet. Refin.

Primary Examiner—Herbert J. Lilling
Attorney, Agent, or Firm—Burns, Doane, Swecker & Mathis

[57] ABSTRACT

A polyacetal resin composition comprises polyacetal and a two- or more-stage polyacrylate comprising a rubber like first stage and a thermoplastic rigid final stage. It is useful for a metallized article with a high impact resistance.

3 Claims, No Drawings

POLYACETAL RESIN COMPOSITION

This invention relates to a polyacetal resin composition suitable for use in the field of metallized articles.

STATEMENT OF PRIOR ARTS

Polyacetals have various excellent properties, such as mechanical, anti-static, thermal, long-term, and molding properties, and therefore are widely utilized as engineering plastics for functional components in various industrial fields, such as machine parts and electrical components. In such areas as auto parts, where impact resistance is required, polyacetal resins are effectively utilized as well. In order to give a beautiful appearance to such parts, it is a current practice to metallize the polyacetal resin articles. In this conjunction, there has been much research directed to metallizing techniques.

Generally, however, metallizing of a polyacetal resin results in lowering its impact resistance, a characteristic feature of the resin. For some end-uses, therefore, metallizing has been considered undesirable. Among auto parts, for example, there are many such parts for which any deterioration in impact performance due to metallizing is disfavored.

SUMMARY OF THE INVENTION

In view of the aforesaid difficulty, the present inventors have directed their research efforts toward providing metallized polyacetal products having excellent impact properties. As a result, it has been found to be possible to obtain a metallized product having excellent impact properties by using a polyacetal resin composition incorporating a specific polyacrylate rubber.

The polyacetal resin composition of the present invention comprises 99.5 to 50 percent by weight of polyacetal and 0.5 to 50 percent by weight of a two- or more-stage polyacrylate comprising a rubber like first stage and a thermoplastic rigid final stage. The polyacrylate is preferred to be a two-stage polymer which has been obtained by polymerizing monomers including butyl acrylate, butylene diacrylate and allyl methacrylate or di-allyl maleate in the first stage and polymerizing methyl methacrylate in the final stage.

That is, the invention provides a polyacetal composition comprising 0.5 to 50% by weight of a particular polyacrylate-resin based modifier incorporated into a polyacetal, and more specifically, a polyacetal resin composition wherein the polyacetal resin contains 0 to 10% by weight of an inorganic substance, preferably calcium carbonate. The invention will now be described in further detail.

The polyacrylate resin modifier is a multi-stage polymer having a rubber-like first stage and a thermoplastic rigid final stage. One or more intermediate stages may be arbitrarily selected. For example, an intermediate stage may be a polymerization of about 75 to 100% by weight of styrene. However, a preferred polyacrylate-based modifier consists of a two-stage polymer, the first stage being a polymerization of monomers including a butyl acrylate and a butylene diacrylate as a crosslinking agent, and allyl methacrylate or diallyl maleate as a grafting agent.

For such a multistage polymer having a rubber-like first stage and a thermoplastic rigid final stage, Acryloid KM330, a product of Rohm & Haas (U.S. Pat. No. 4,096,202) can be preferably used in th composition of the present invention. The modifier composed of such polyacrylate resin is added in a proportion of 0.5 to 50% by weight relative to the entire amount of the composition. If the modifier addition is less than 0.5% by weight, it has no sufficient effect for impact property improvement, and if the addition is more than 50% by weight, it may be unfavorably reflected in the physical properties of the molded product. Preferably, the addition should be within the range of 3 to 15% by weight. If the plate adhesion of the metallized article is considered, an optimum range of addition is 5 to 15% by weight.

The polyacetal used in the composition of this invention may be either a homopolymer or a copolymer. There is no particular limitation in respect of polymerization degree; the polyacetal is acceptable if it has a fair molding fluidity and sufficient mechanical properties for the intended product. The resin may contain other components such as lubricants and stabilizers. For the purpose of the invention in particular, it is preferable to use a polyacetal resin containing an inorganic substance. Among useful inorganic substances are calcium carbonate, glass, silica, talc, and pumice, with calcium carbonate being preferred. Such a polyacetal resin presents a moderately rough surface after it is subjected to pre-metallizing surface treatment, e.g. etching, and has high activity therefore, it exhibits very high plate adhesion. In the case of calcium carbonate being incorporated by addition into the polyacetal resin, the effect on plate adhesion is satisfactory where the addition is in an amount of 1 to 10% by weight relative to the composition as a whole. Good surface luster effect is also obtainable in that case. If the addition is more than 10% by weight, stable plate adhesion cannot be obtained, nor is it possible to obtain good surface effect.

The addition of an inorganic substance contributes also toward improving the rigidity of molded product and reducing its possible dimensional change. Preferably, the inorganic substance has a particle diameter of tens of m $\mu$m to 10 odd $\mu$m. In the case of calcium carbonate, heavy calcium carbonate, choke, and light calcium having a particle diameter of tens of 1 $\mu$m may be used. Various synthetics of the kind having a particle diameter of 10m $\mu$m to hundreds of m $\mu$m, may also be used. With respect of plate adhesion, coarse particles (1 $\mu$m to 10 odd $\mu$m) are preferable, but if luster effect on the metallized product is considered, fine-particle calcium carbonate is preferred, rather than heavy calcium carbonate.

The composition of the present invention can be prepared in various ways. For example, the resin component and the modifier can be melted and kneaded and then extruded into pellets by means of an extruder, which pellets are then turned out into moldings by using a molding machine. The composition of the invention can be satisfactorily metallized according to any known method. That is, metallizing can be performed with good plate adhesion effect by passing through such stages as degreasing, acid etching, washing, sensitizing, activation, or a combination of sensitizing and activation, that is, catalyst treatment, electroless plating, and electroplating. Etching by acid is carried out preferably by dipping in a mixed solution of hydrochloric acid and sulfuric acid, e.g., a mixed solution containing concentrated hydrochloric acid, concentrated sulfuric acid, and water in the ratio of 1:1:2 by volume (about 8.6 wt % HCl+about 35.3 wt % $H_2SO_4$) for 5 to 30 min.

The invention will now be further illustrated by the following examples and comparative examples. The invention however, is not to be construed as being limited in any way by these examples.

TABLE 1

| | Composition (wt %) | | | Property | | |
| --- | --- | --- | --- | --- | --- | --- |
| | Polyacetal copolymer resin | Calcium* carbonate | Acryloid KM330 | Izod impact strength notched (kg · cm/cm) | | Plate adhesion (g/cm) |
| | | | | Before plating | After plating | |
| Example 1 | 93 | 2 | 5 | 6.3 | 4 | 2.4 |
| Example 2 | 88 | 2 | 10 | 6.8 | 4.5 | 2.1 |
| Example 3 | 83 | 2 | 15 | 6.9 | 4.5 | 1.4 |
| Comp. Example 1 | 98 | 2 | 0 | 4.9 | 2 | 2.4 |
| Example 4 | 95 | 0 | 5 | 6.3 | 4 | 1.4 |
| Example 5 | 94 | 1 | 5 | 6 | 4 | 2 |
| Example 6 | 80 | 10 | 10 | 5.7 | 3.3 | 2.1 |
| Comp. Example 2 | 93 | 2 | Polyurethane 5 | 6.5 | 3.5 | 0.8 |

*Mean particle diameter 1 μm

Examples 1 to 6 and Comparative Examples 1 and 2

To a polyacetal copolymer resin were added a polyacrylate-based modifier consisting of a multistage polymer having a rubber-like first stage and a thermoplastic rigid final stage (Acryloid KM330, a product of Rohm & Haas) and calcium carbonate in such ratio as shown in Table 1. The mixture was then melted, kneaded, and extruded into a molding by an extruder. The molding was annealed, degreased, subjected to etching, subsequently subjected to catalyst treatment and finally to metallizing. The metallized product thus obtained was tested by measuring the Izod impact strength (notched). Also, for measuring plate adhesion a 1 cm mar extending form the plated surface to the resin layer was made on the metallized product by using a knife and the load required for peeling off the plate was measured.

For comparison purposes, similar tests were made with a system incorporating no polyacrylate-based modifier and one incorporating a polyurethane instead of such modifier. The test results are shown in Table 1.

The embodiments of the invention in which an exclusive privilege or property is claimed are defined as follows:

1. A polyacetal resin molding composition which comprises 99.5 to 50 percent by weight of a polyacetal homopolymer or copolymer, 0.5 to 50 percent by weight of a multi-stage polyacrylate having an elastomeric first stage and a thermoplastic rigid final stage and an inorganic substance selected from the group consisting of calcium carbonate, glass, silica, talc and pumice.

2. A polyacetal resin composition as claimed in claim 1, in which said polyacrylate is a two-stage polymer which has been obtained by polymerizing monomers including a butyl acrylate, butylene diacrylate and allyl methacrylate or di-allyl maleate in the first stage and polymerizing methyl methacrylate in the final stage.

3. A polyacetal resin composition as claimed in claim 1 or 2, wherein the inorganic substance is calcium carbonate.

* * * * *